C. McBRATNEY.
MEAT MANGLE OR TENDERER.
APPLICATION FILED NOV. 30, 1908.
937,322.
Patented Oct. 19, 1909.
2 SHEETS—SHEET 2.
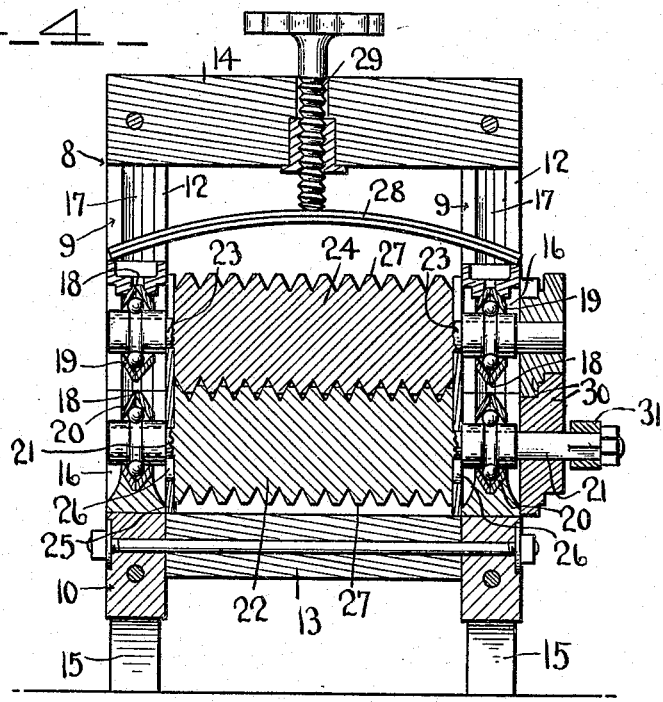
Fig. 4.
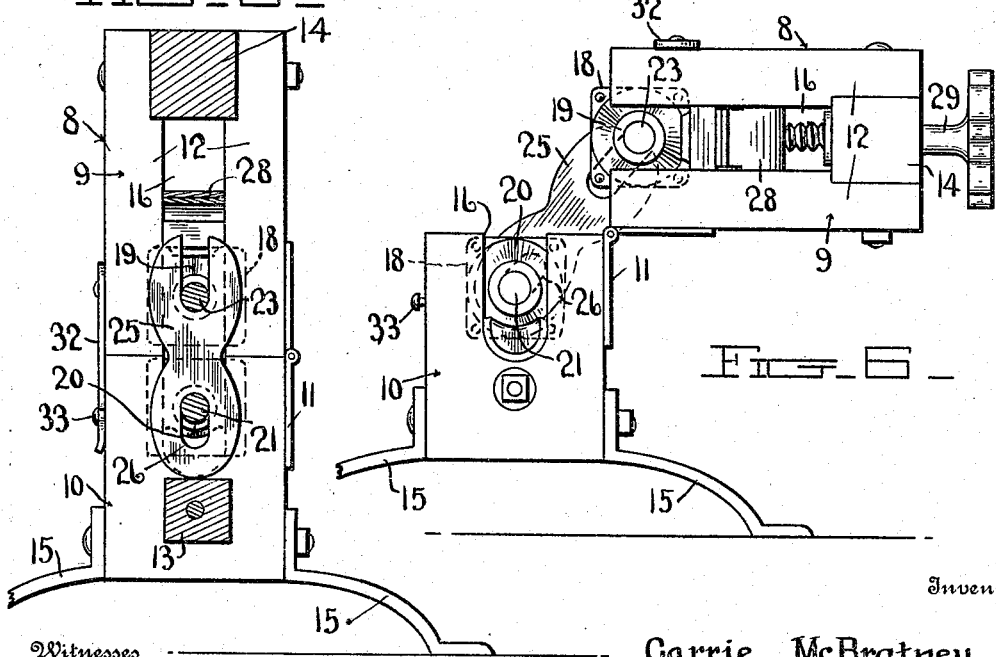
Fig. 5.
Fig. 6.
Witnesses
L. B. James
M. T. Miller
Inventor
Carrie McBratney
By Brandes & Brandes
Attorneys

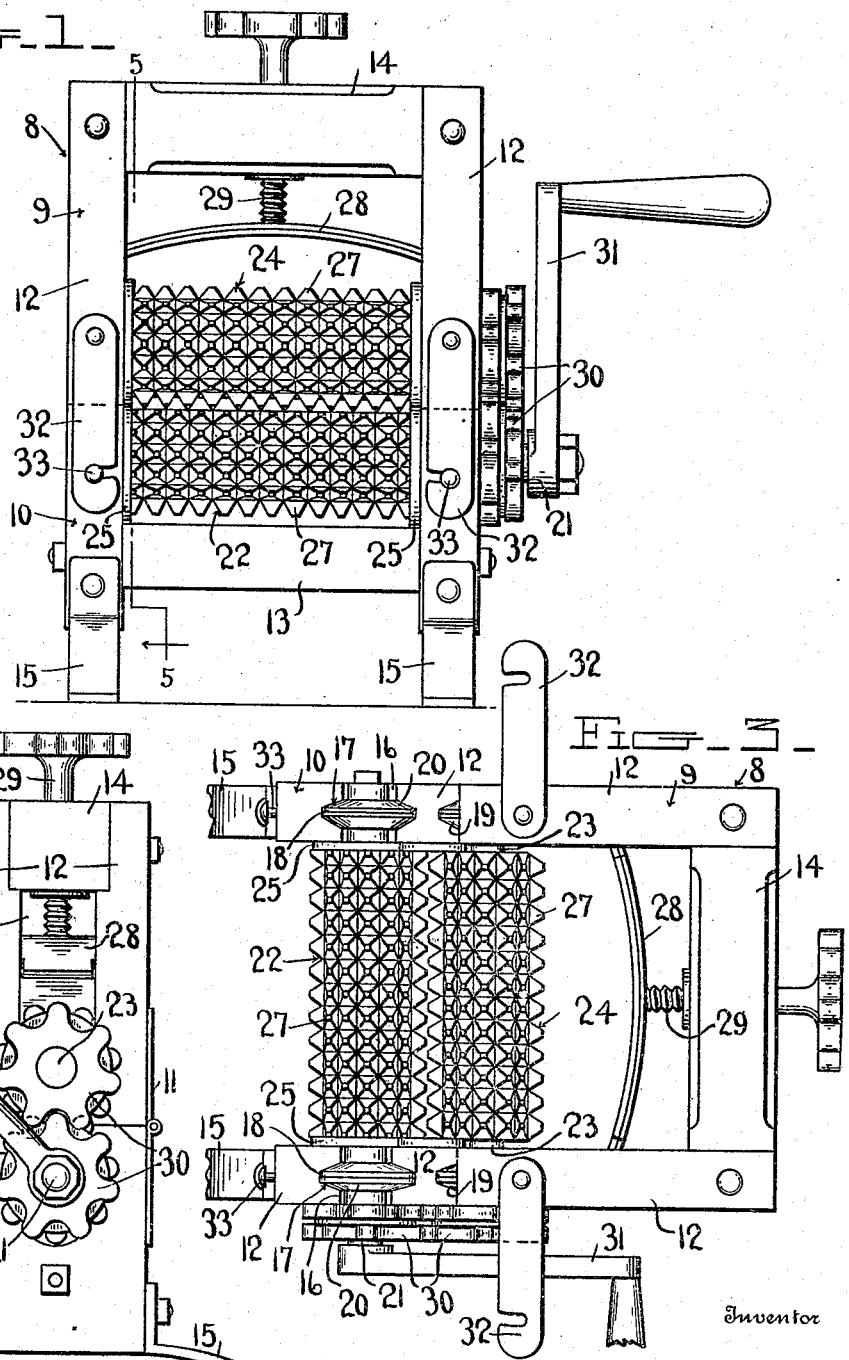

UNITED STATES PATENT OFFICE.

CARRIE McBRATNEY, OF FORT DODGE, KANSAS, ASSIGNOR OF ONE-HALF TO LEE ALLMON, OF ASHLAND, KANSAS.

MEAT MANGLE OR TENDERER.

937,322.  Specification of Letters Patent.  Patented Oct. 19, 1909.

Application filed November 30, 1908. Serial No. 465,232.

*To all whom it may concern:*

Be it known that I, CARRIE McBRATNEY, a citizen of the United States, residing at Fort Dodge, in the county of Ford, State of Kansas, have invented certain new and useful Improvements in Meat Mangles or Tenderers; and I do hereby declare the following to be a full, clear, and exact description of the invention, such as will enable others skilled in the art to which it appertains to make and use the same.

The invention relates to a meat mangle and more particularly to the class of machines for treating meats to make the same tender.

The primary object of the invention is the provision of a meat mangle or tenderer comprising a frame structure formed of two sections hinged to each other, a pair of rotatable rollers having roughened working surfaces, one of said rollers being held in close relation to the other roller by a tensioning means, and means for rotating the rollers in unison and between which rollers is adapted to be passed a piece of meat such as a steak or the like, so that the tissues therein will be severed to make the steak tender.

A further object of the invention is the provision of a meat mangle or tenderer in which a pair of rollers are slidably mounted in a guide frame, slidable journal bearings supporting the rollers in the frame, link connections between the journals of the rollers to separate one from the other upon the swinging of the upper section on its hinges to one side of the lower section, and tension means for holding the rollers in close operative relation with respect to each other, so that upon passing meat between the rollers, the latter will act thereupon to sever the tissues of the meat to make the same tender.

In the drawings, accompanying and forming a part of this specification, is illustrated the preferred form of embodiment of the invention, which to enable those skilled in the art to practice the invention, will be set forth at length in the following description, while the novelty of the invention will be included in the claim succeeding said description.

In the drawings:—Figure 1 is a front elevation of the invention. Fig. 2 is a side elevation thereof. Fig. 3 is a top plan view with the upper section moved upon its hinges to one side of the lower section. Fig. 4 is a vertical longitudinal sectional view. Fig. 5 is a sectional view on the line 5—5 of Fig. 1. Fig. 6 is a side elevation with the upper section of the frame swung to one side of the lower section.

Similar reference characters indicate corresponding parts throughout the several views in the drawings.

In the drawings, the numeral 8 designates, generally, the main frame of the machine and comprises upper and lower sections 9 and 10, the same being connected by hinges 11, so as to permit the upper section to be swung to one side of the lower section. Each section is constructed of spaced end guide pieces 12, the same of the lower section 10 being connected by a cross beam or bar 13, and the guide pieces of the upper section being connected by a cross beam or bar 14. To support the frame 8 in a vertical position, there are provided outwardly diverging legs 15, which latter are connected to opposite edges of the lower section 10 of the frame.

Contained in the guide pieces 12 of the upper and lower sections 9 and 10, respectively, are elongated openings or slots 16 which are adapted to aline with each other when the upper section 9 is in a closed position or is swung upon its hinges into alinement with the guide pieces of the lower section of the frame. In opposite longitudinal walls or sides of the openings or slots 16, are guide grooves 17, which latter are engaged by guide tongues or flanges 18 formed on alining pairs of journal bearings 19 and 20, which latter pair of bearings support or receive the journal ends 21 of a lower roller 22, which latter is held or mounted in the lower section of the frame.

Mounted in the journal bearings 19 which are arranged in the upper section 9, are the journal ends 23 of an upper roller 24 and loosely connected to the journal ends 23 of this said upper roller are the upper ends of coupling links 25, the opposite ends of which contain elongated slots 26 receiving the journal ends 21 of the lower roller, and which slots 26 permit the separation of spacing of the upper roller with respect to the lower roller upon the swinging of the upper section 9 on its hinges to one side of the lower section.

On the working faces of the rollers 22 and 24, respectively, are formed rows of teeth 110 having blunt ends 27, which teeth of one roller coact with the teeth of the other roller when the said rollers are held in close relation to act upon meat passed therebetween to shred or disintegrate the fibers of the meat for the purpose of making the same more tender.

Mounted within the upper section 9 and having opposite ends contacting with the bearings 20, is an upwardly bowed flat spring 28, which latter is supported below the cross bar 14 and which spring is acted upon or tensioned by a regulating screw 29 threaded centrally in a vertical manner in the cross bar 14, so as to adjust the close relation of the rollers with respect to each other and to maintain the latter in their adjusted position. However, it is obvious that should the meat contain a bone, the said rollers will be free to separate from each other, due to the mounting of the bow spring in the upper section of the frame.

Connected to the journal ends of the rollers, exteriorly of the frame 8, are double cogged gears or pinions 30 which are adapted to mesh with each other when the upper section is closed upon the lower section, so that rotary movement imparted to one roller will cause a like movement to be imparted to the other roller. Fixed to one journal end of the upper roller 24, is a manually operable crank handle 31, whereby rotary motion can be imparted to the rollers at the will of the operator.

Pivoted to the upper section 24 are swinging catch members 32, the latter being adapted to be brought into locked engagement with pins 33 projecting from the lower section 12, so as to maintain the said upper section in a closed position upon the lower section. The said catch members 32, when released, will permit the upper section to be swung to one side of the lower section to separate or space apart the rollers mounted in the frame of the machine.

What is claimed is:—

A machine of the class described, comprising a frame with hinged upper and lower sections containing slotted guides in opposite sides thereof, ball retaining cup bearings slidable in said guides, upper and lower rollers rotatably journaled in the bearings, tension means acting upon bearings supporting the one roller to hold the same in close yieldable relation to the other, means for regulating said tension, spaced link connections between the rollers and having lower closed slots in which the lower roller is journaled and upper open slots in which the upper roller is journaled, the open slots being adapted to free said upper roller upon raising the one section with respect to the other, teeth projecting from the working faces of the rollers, means rotating the rollers in unison, and locking members holding one section closed upon the other.

In testimony whereof, I affix my signature, in presence of two witnesses.

CARRIE McBRATNEY.

Witnesses:
JOHN GRAVES,
JOHN H. OSBORN.